United States Patent [19]

Bella et al.

[11] Patent Number: 5,703,411
[45] Date of Patent: Dec. 30, 1997

[54] RE-USEABLE EMERGENCY VEHICLE WIRING HARNESS AND CONTROL SYSTEM

[75] Inventors: James Bella, Atherton; William G. Clark, Santa Cruz, both of Calif.

[73] Assignee: TransCom Corporation, Menlo Park, Calif.

[21] Appl. No.: 597,457

[22] Filed: Feb. 2, 1996

[51] Int. Cl.⁶ ................................................. G08B 5/00
[52] U.S. Cl. ........................................ 307/10.1; 340/472
[58] Field of Search ............................... 307/9.1, 10.1, 307/10.6, 10.8, 147; 361/826, 827, 627–630; 315/77–83; 340/463, 468, 472, 479, 425.5; 439/34–36; 364/424.05; 62/3.61

[56] References Cited

U.S. PATENT DOCUMENTS

| | | |
|---|---|---|
| 3,868,684 | 2/1975 | Nunn, Jr. . |
| 4,040,050 | 8/1977 | Nunn, Jr. . |
| 4,114,071 | 9/1978 | Thrower, Jr. et al. ............ 315/82 |
| 4,842,524 | 6/1989 | Hopkins et al. ................. 439/35 |
| 4,950,913 | 8/1990 | Kephart .......................... 307/10.7 |
| 5,023,752 | 6/1991 | Detter et al. . |
| 5,140,304 | 8/1992 | Miller ............................... 340/472 |
| 5,355,119 | 10/1994 | Pearlman ......................... 340/472 |
| 5,357,142 | 10/1994 | Kubota et al. .................. 307/10.1 |
| 5,422,623 | 6/1995 | Bader et al. ..................... 340/472 |
| 5,428,535 | 6/1995 | Katsumata et al. ............ 364/424.05 |
| 5,434,553 | 7/1995 | Rhodes ............................ 340/472 |

Primary Examiner—Richard T. Elms
Attorney, Agent, or Firm—David H. Jaffer

[57] ABSTRACT

A system having an integrated control unit for installation in an emergency vehicle, the unit responsive to inputs and operative to output control signals to emergency vehicle electrical apparatus through a pre-fabricated wiring harness. The wiring harness is designed with connectors and an overall configuration requiring only minor alterations to the vehicle structure, allowing easy installation primarily through ducts and openings used by the vehicle manufacturer for conventional wiring installations. The harness is designed to be readily removable for installation in another vehicle of either the same or different model, when the existing vehicle is to be retired from service. The system has numerous features including an opto-isolator and noise filter to provide a reliably detected signal indicative of the state of the vehicle's transmission, the control unit operative in response to modify the emergency vehicle conditions when the vehicle is stopped.

87 Claims, 13 Drawing Sheets

RE-USEABLE EMERGENCY VEHICLE WIRING HARNESS AND CONTROL SYSTEM

BACKGROUND OF THE INVENTION

1. Field of the Invention

The present invention relates generally to emergency vehicle electrical control systems, and more particularly to a control unit and prefabricated wiring harness that is easily installed in a vehicle and transferable from one vehicle to another with a minimum of labor.

2. Description of the Prior Art

The installation of special electrical and electronic apparatus required in new emergency vehicles is done on a special order basis, with each item separately installed and wired. Included in these items are sirens, high beam oscillators, radios, ignition timers, etc. The installation is very labor intensive. For example, approximately eleven hours are required for a typical patrol car installation. When the vehicle is no longer useable, the investment in the costly wiring installation is lost, since it is not transferable to another vehicle. As a result of this hand wired approach, fleet consistency is a nationwide problem. For example, no standard exists for circuit fusing and loading, and wire colors are applied in an unending variety without any standards as to their use. Because of a lack of standardized wiring, repair and maintenance is very difficult.

SUMMARY OF THE INVENTION

It is therefore an object of the present invention to provide an improved wiring harness and control system for an emergency vehicle that reduces the labor requirements for installation in the vehicle.

It is a further object of the present invention to provide an emergency vehicle wiring harness and control system that can be easily removed from one vehicle and installed in another vehicle when the original vehicle has met its service life.

Briefly, a preferred embodiment of the present invention includes a system having an integrated control unit for installation in an emergency vehicle, the unit responsive to inputs and operative to output control signals to emergency vehicle electrical apparatus through a pre-fabricated wiring harness. The wiring harness is designed with connectors and an overall configuration requiring only minor alterations to the vehicle structure, allowing easy installation primarily through ducts and openings used by the vehicle manufacturer for conventional wiring installations. The harness is designed to be readily removable for installation in another vehicle of either the same or different model, when the existing vehicle is to be retired from service. The system has numerous features including an opto-isolator and noise filter to provide a reliably detected signal indicative of the state of the vehicle's transmission, the control unit operative in response to modify the emergency vehicle conditions when the vehicle is stopped.

IN THE DRAWINGS

Figure 3:
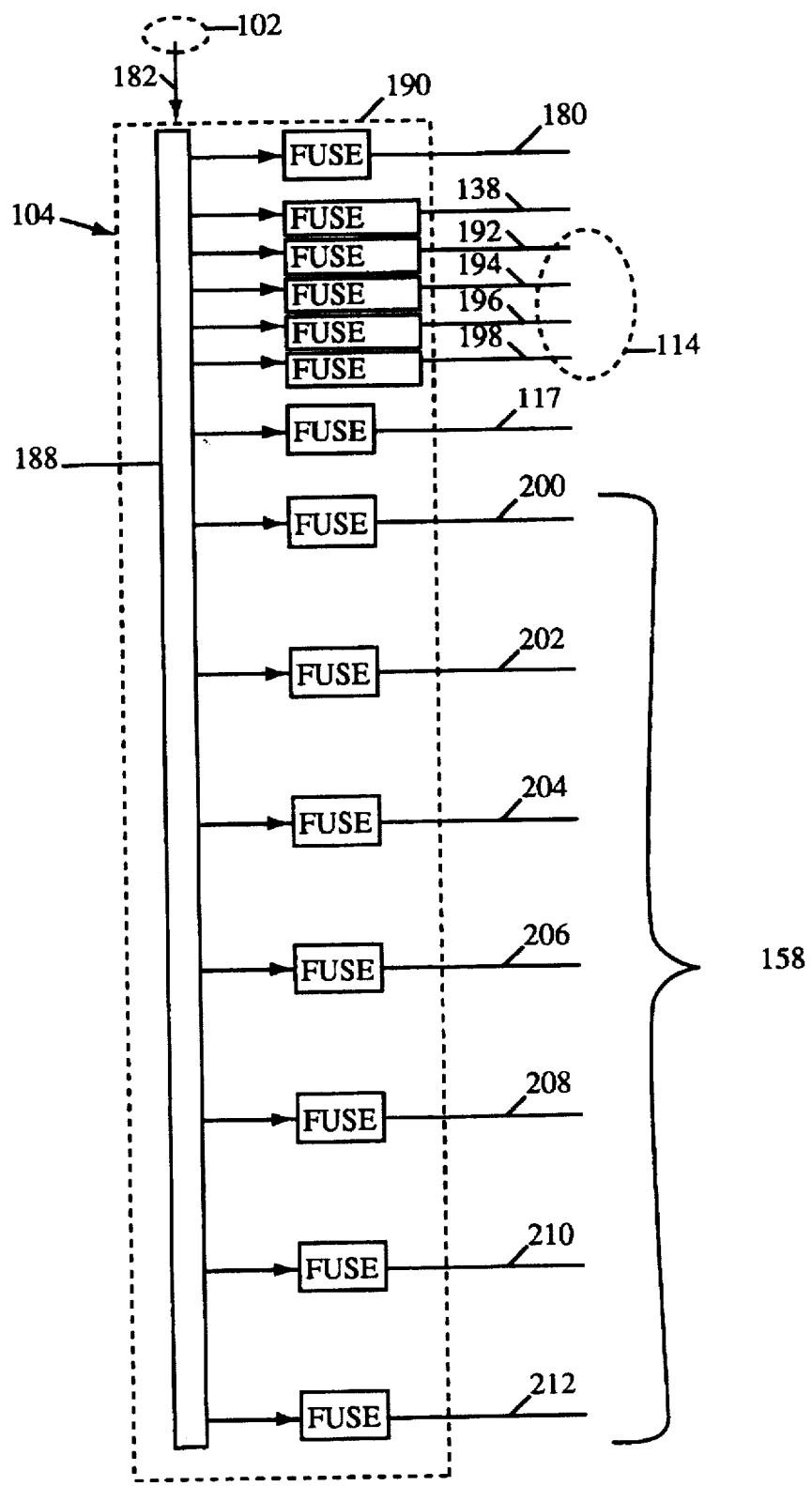
Figure 4:
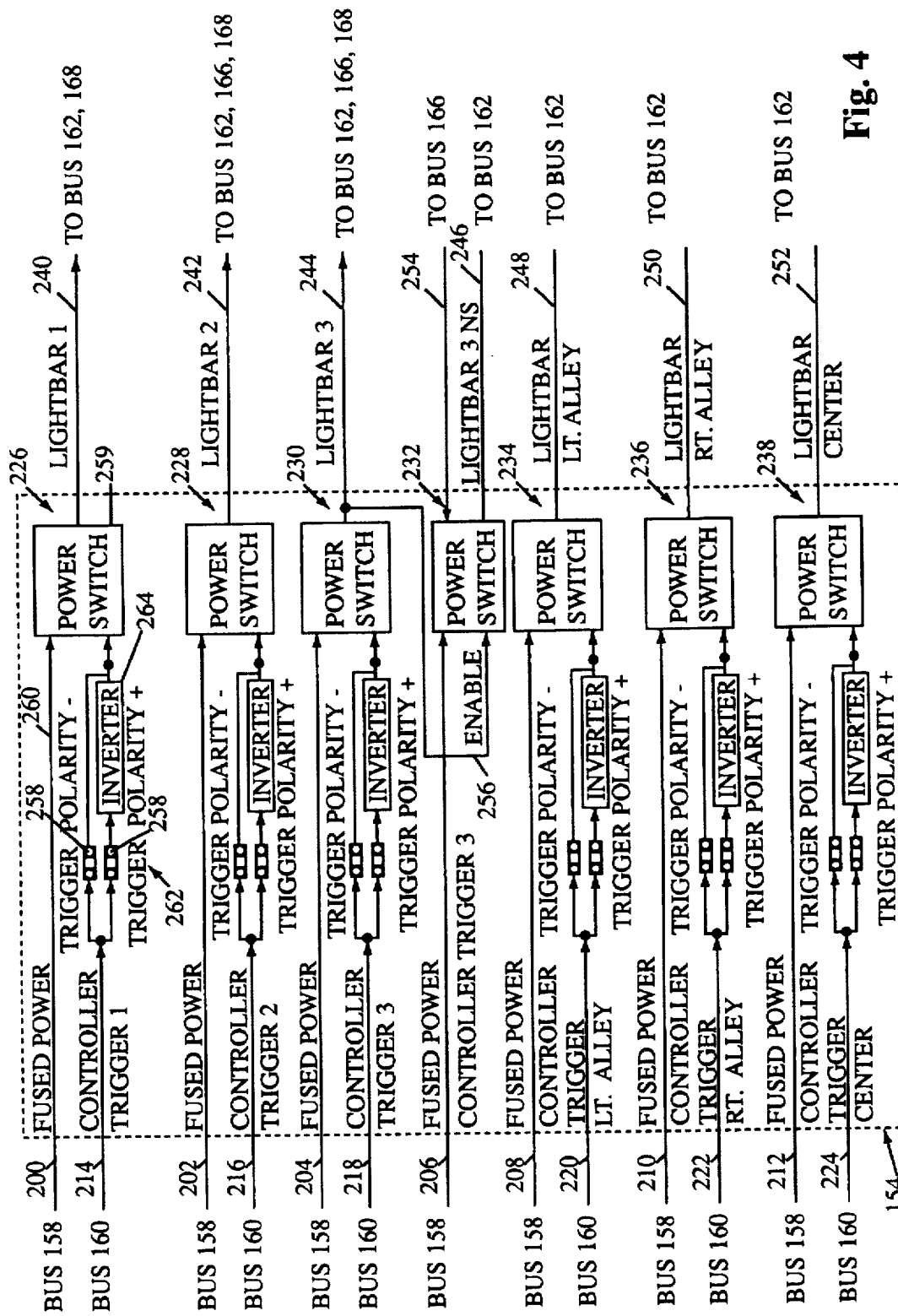
Figure 5:
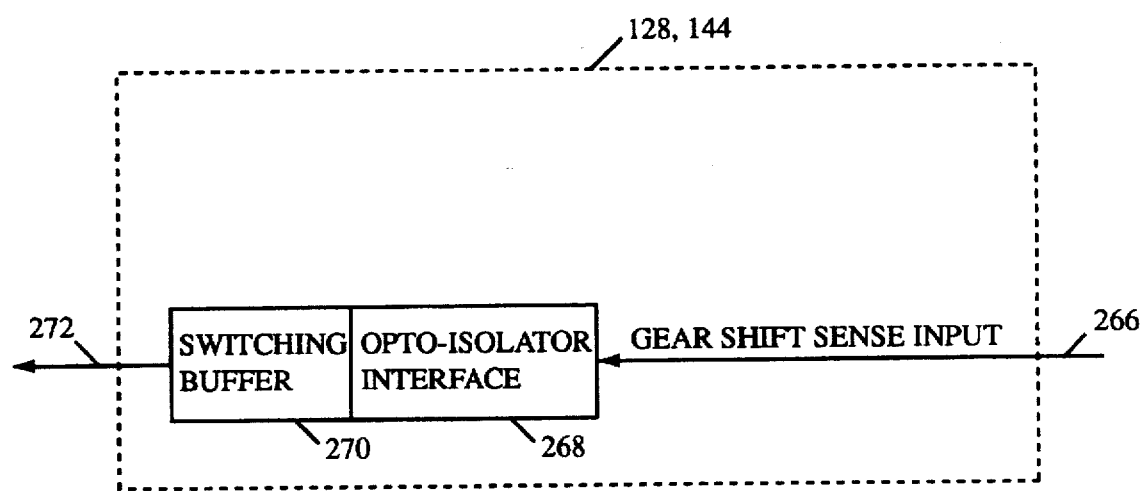
Figure 6:
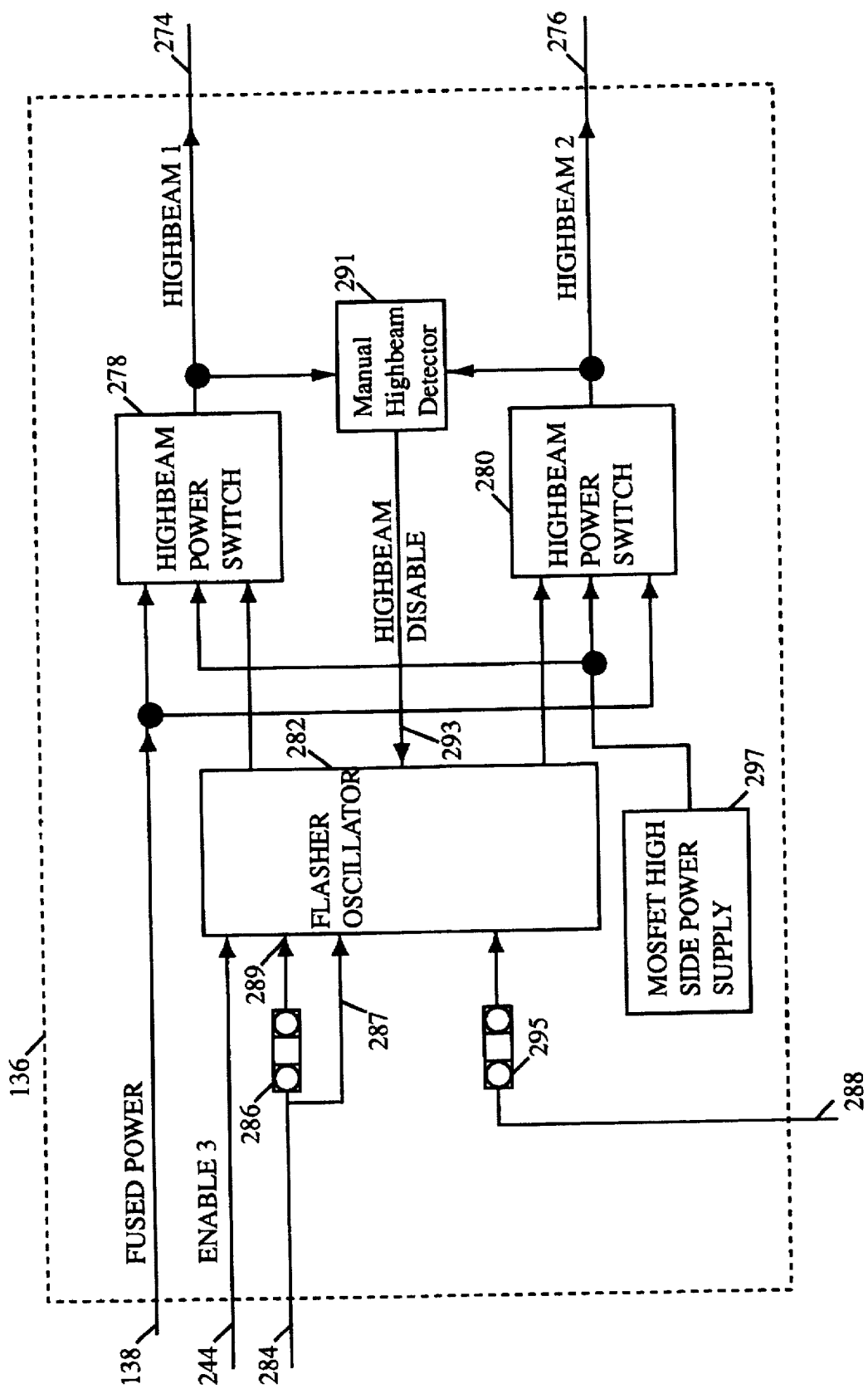
Figure 7:
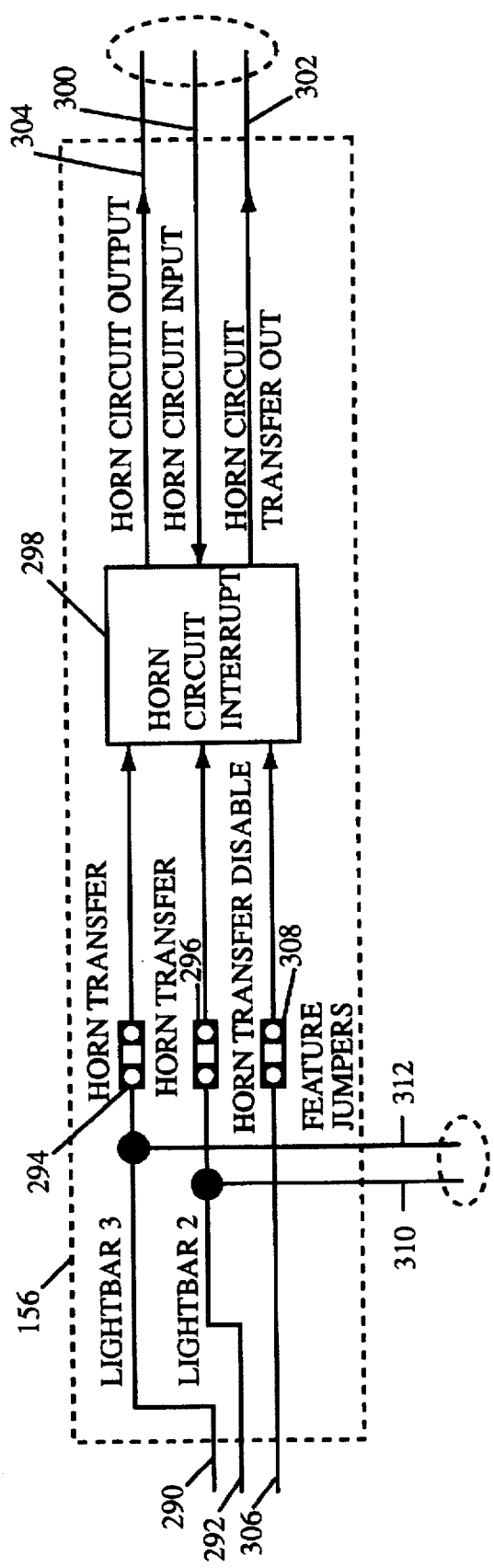
Figure 8:
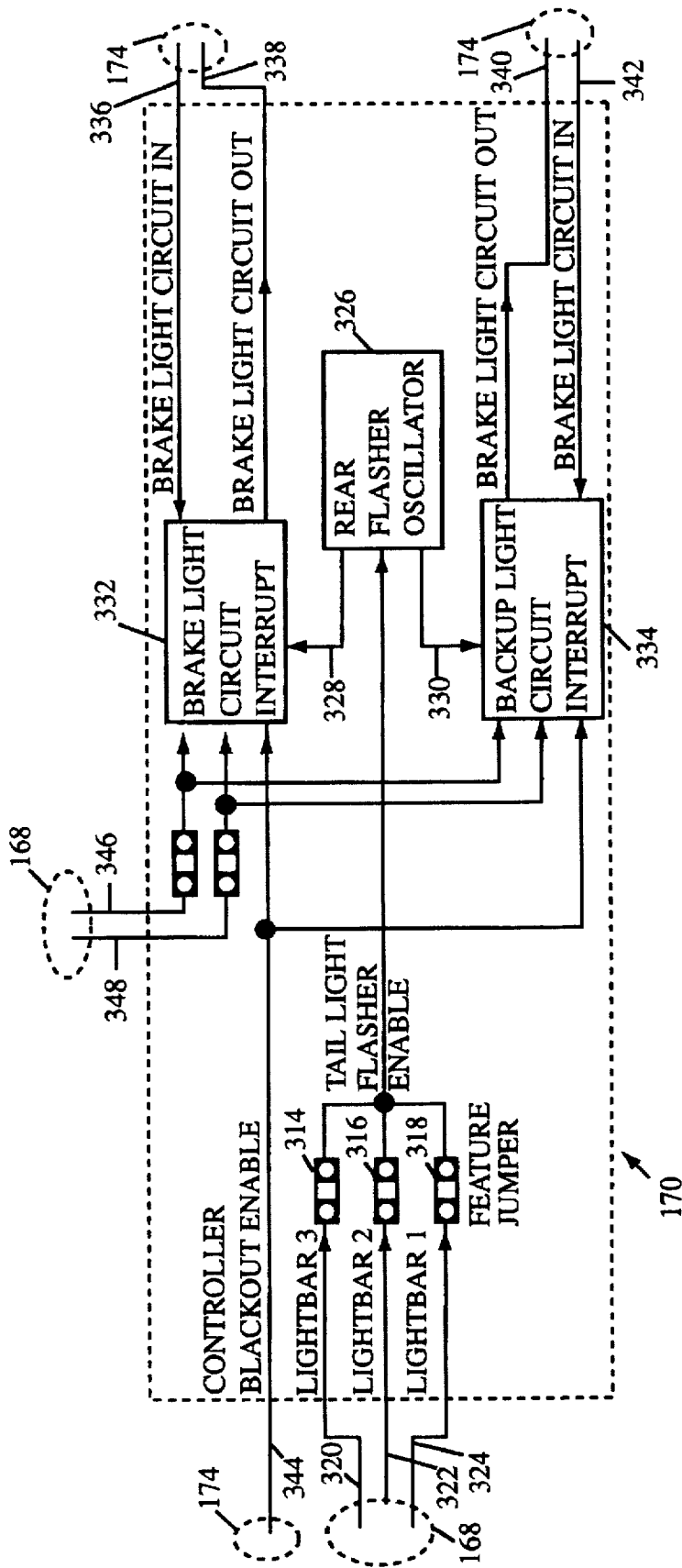
Figure 9:
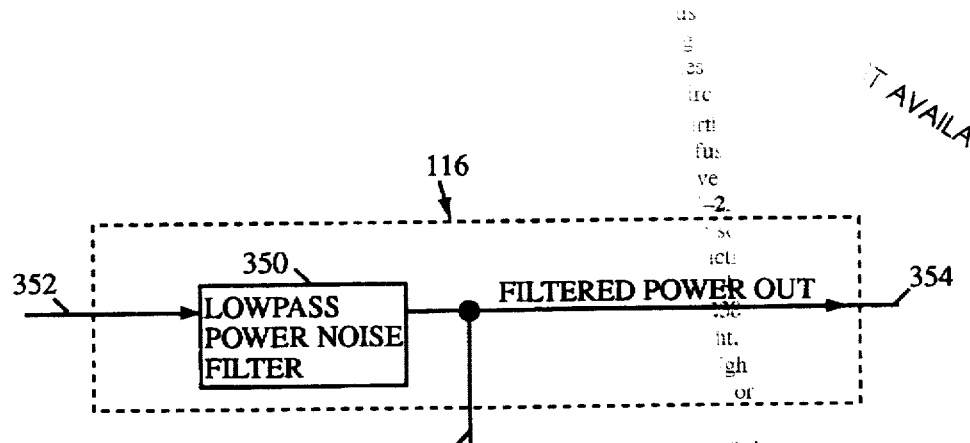
Figure 10:
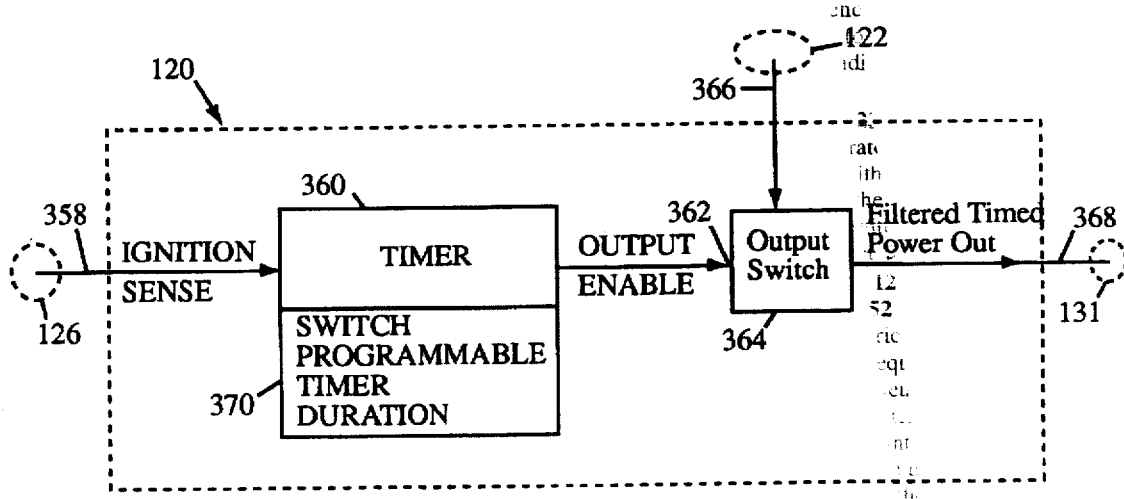
Figure 11:
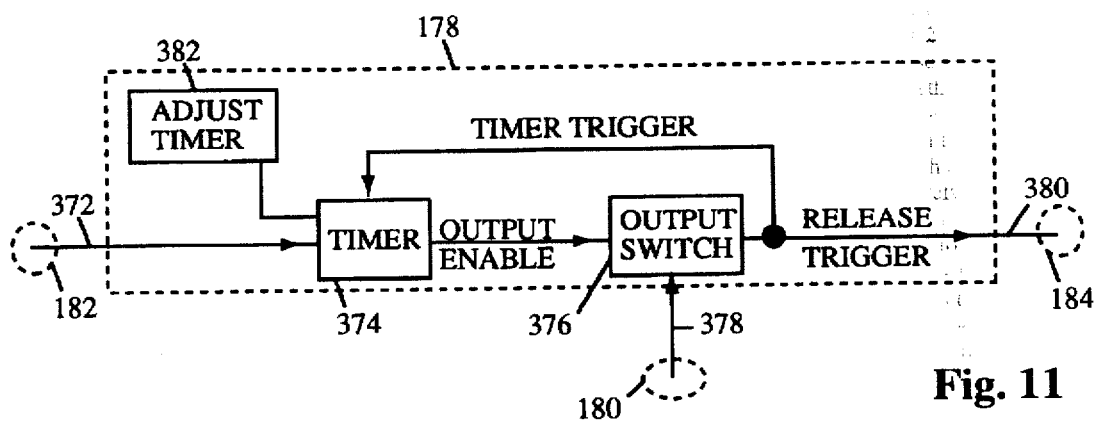
Figure 12:
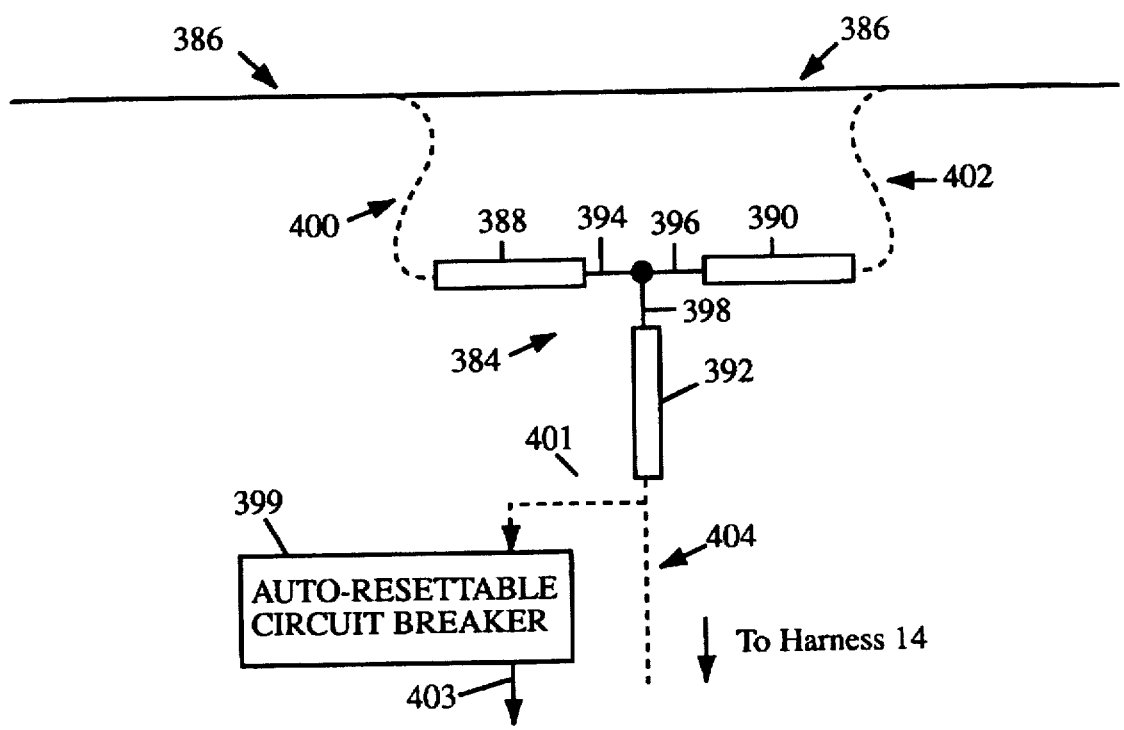
Figure 13:
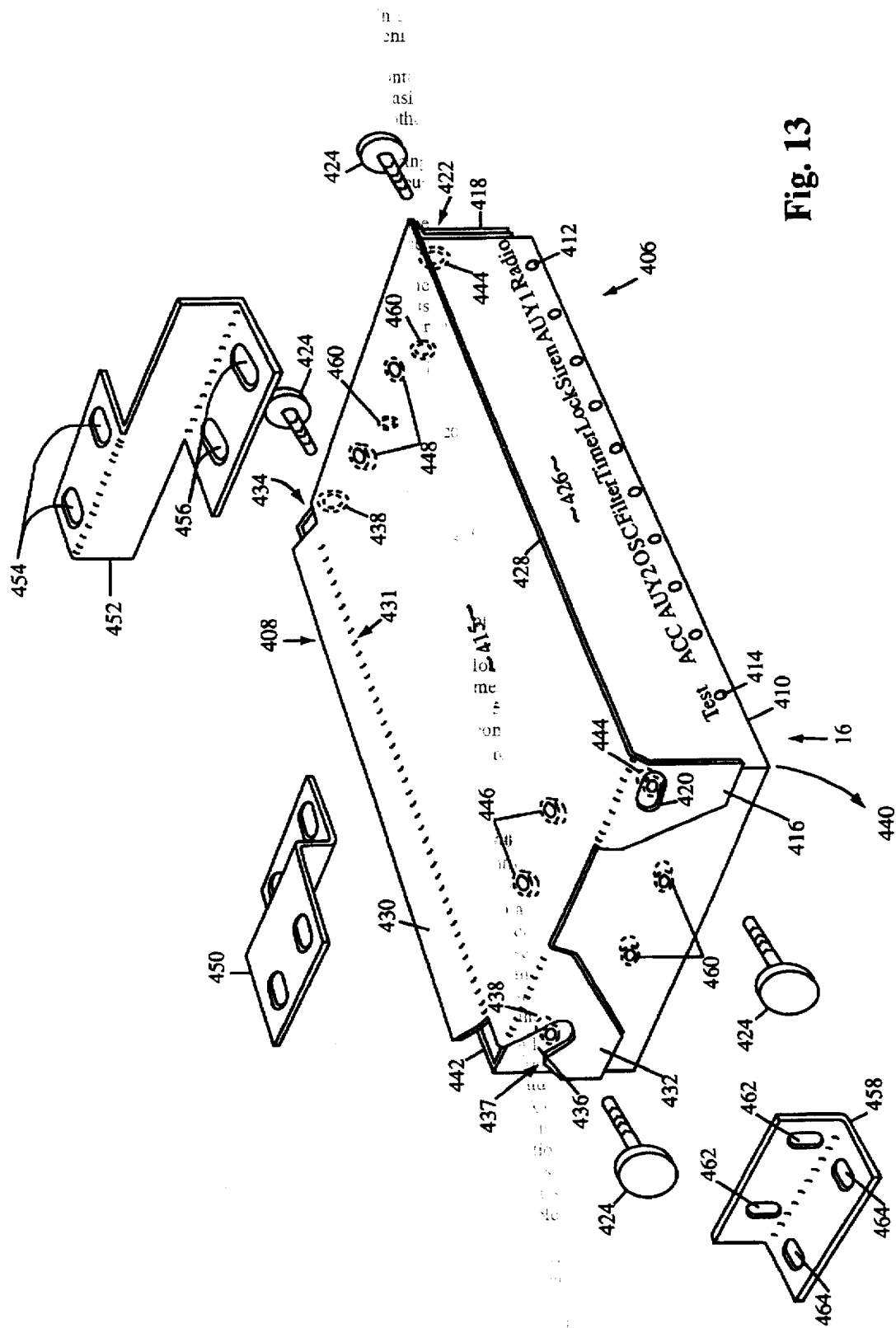
Figure 14:
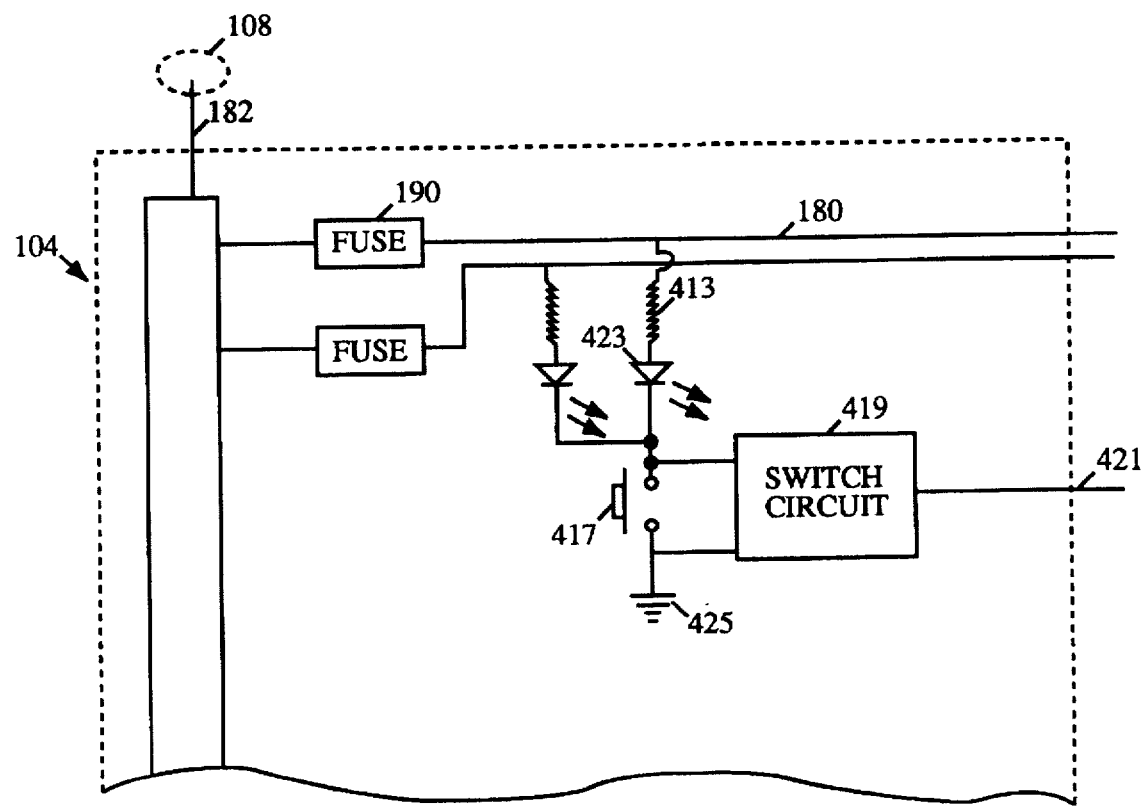
Figure 15:
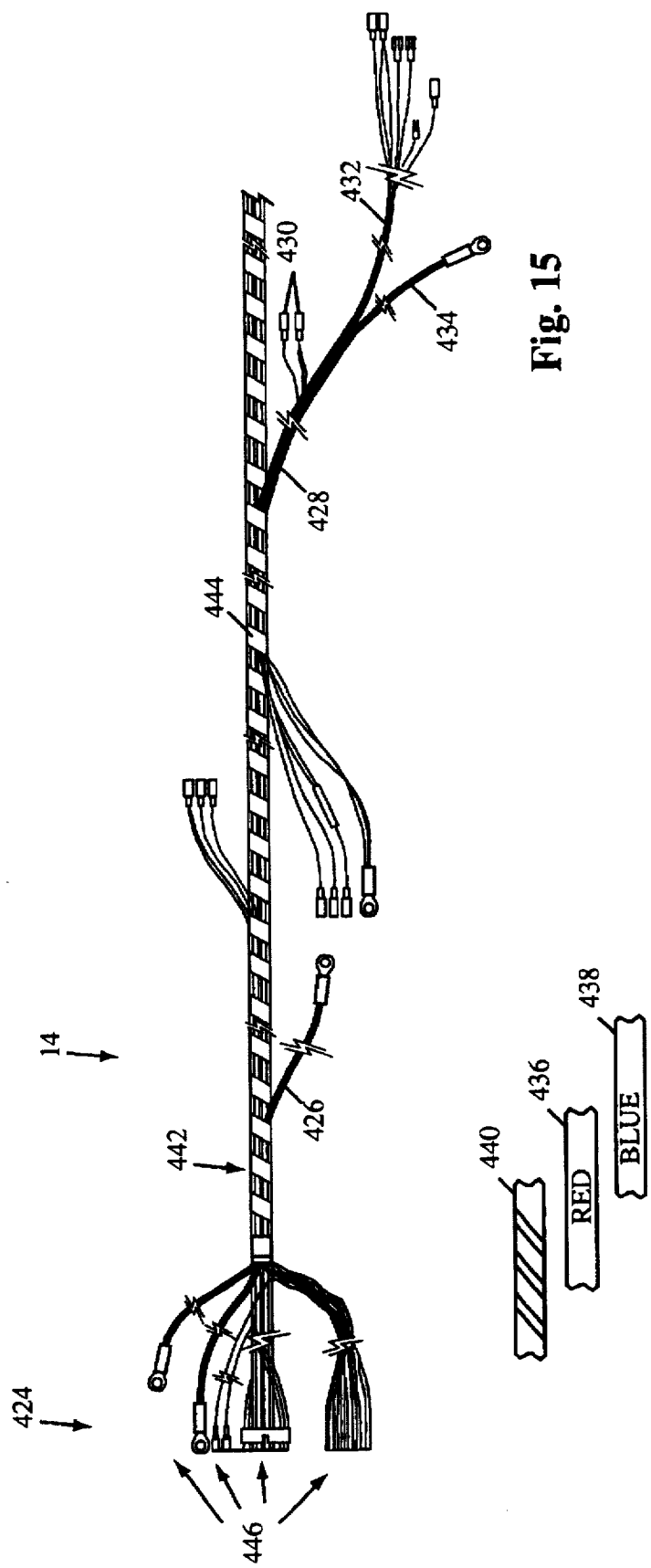

FIG. 3 adds details of the load shedder;

FIG. 4 shows the circuitry of the light bar switch circuit;

FIG. 5 is a block diagram of the opto-isolator;

FIG. 6 shows the circuitry of the high beam oscillator;

FIG. 7 shows detail of the horn circuit;

FIG. 8 gives details of the rear tail light circuit;

FIG. 9 shows the low pass filter circuit;

FIG. 10 gives details of the ignition timer circuit;

FIG. 11 gives detail of the release timer circuit;

FIG. 12 shows the Y adaptor;

FIG. 13 illustrates the enclosure and mounting of the control unit;

FIG. 14 shows details of the LED indicator circuitry;

FIG. 15 illustrates features of the wiring harness; and

Figure 16:
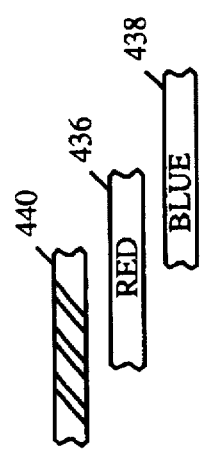

FIG. 16 illustrates the use of color coded wires in the harness.

DETAILED DESCRIPTION OF THE PREFERRED EMBODIMENT

Figure 1:
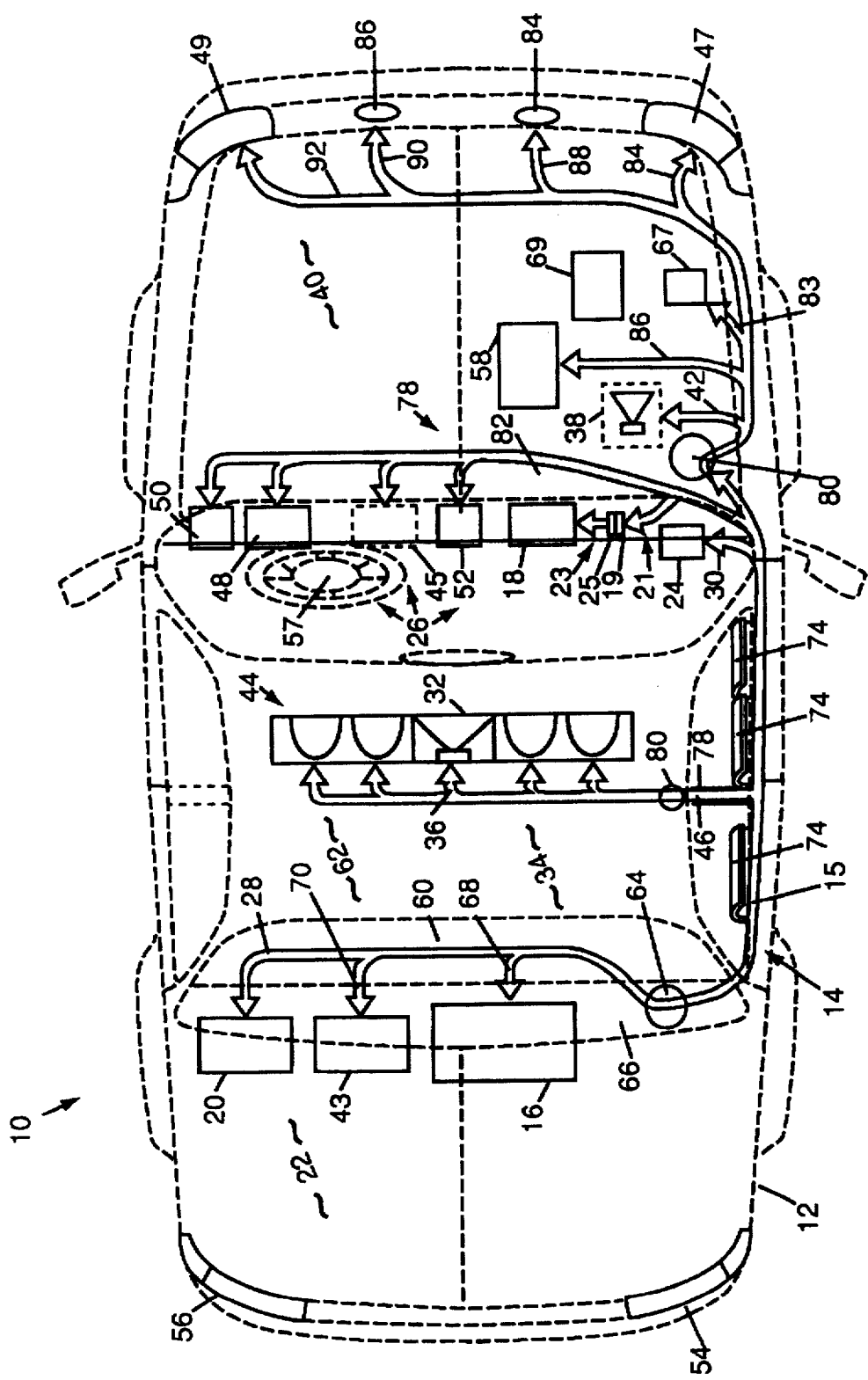
FIG. 1 is an illustration of the system installed in a car.

Referring now to FIG. 1 of the drawing, a preferred embodiment of the present invention is shown wherein a replaceable wiring harness and control system 10 is installed on an emergency vehicle 12. The wiring harness 14 is prefabricated for installation, requiring only minor vehicle modifications, relying primarily on ducts, passageways and openings generally provided on the vehicle for existing wiring. Further details of this aspect of the installation will be fully described in reference to the following figures of the drawing.

A control unit 16 receives direction from various user activated controls such as switches, generally indicated in FIG. 1 as control console 18. The control console 18 is typically a box with circuitry and appropriately mounted switches for use by the vehicle operator in selecting the emergency vehicle functions. The console 18 can take many different forms and is used figuratively in the text of the following specification to refer to any switch accessible to the vehicle operator for controlling the system 10. In practice, a variety of different control consoles 18 are in use. A feature of the universal system 10 is to accommodate these various designs by providing a cable connector 19 on the harness 14 portion 21, and to provide an adaptor cable 23 with mating connector 25 so as to allow rapid removal of an existing console 18 and replacement with either a console of the same or different type.

The wiring harness 14 is a set of wires bound together, generally having a main trunk 15 portion from which a number of branches of one or more wires extend to make the necessary connections. The wires may or may not include a particular connector for making the required connection as required by the mating part or line. In the following, the terms bus and branch will be used to describe collections of one or more wires in the harness or other portions of the system 10. Further detail of the harness 14 construction will be described in reference to the following figures of the drawing.

The wiring harness 14 interconnects the control console 18 with the control unit 16, and the control unit 16 to the various emergency vehicle accessories. The interconnections with accessories shown in FIG. 1 are given as an example of a particular embodiment of the invention. Other selections of accessories installed on other types of emergency vehicles are also included in the spirit of the invention. The control unit 16 and harness 14 are designed to include controls and wiring to accommodate a wide range of different emergency vehicle designs. Because of this universal design feature, there will potentially be a number of unused portions of the wiring harness and control unit when the system 10 is installed on any particular design of emergency vehicle. This novel, universal design of the system 10 allows economical, larger scale production, and makes it possible for the system 10 to be removed from one vehicle and re-installed in another, even when the vehicles are of different manufacture. The system 10 also provides a large savings in installation cost relative to prior art systems which are special designs for each vehicle type, with individual wires being routed to each accessory and no set wiring pattern or standard even within a single fleet of vehicles. Typically, it takes 11 hours to wire a prior art special design system. The integrated, pre-fabricated harness and system 10 can be installed in approximately 90 minutes. In addition to installation and maintenance problems associated with the individual designs and wiring of the prior art systems, they also cannot be economically removed and re-installed in another vehicle; the cost of the system therefore being lost when the vehicle is retired. The system 10 of the present invention, on the other hand, can be removed from one vehicle and re-installed on another vehicle, even when the second vehicle is of another manufacture, with minimal installation cost.

The universal design of the system 10 as discussed above, is demonstrated in FIG. 1. For example, the location of a radio 20 is shown as either mounted in the trunk area 22, or as radio 24 in the dash area 26. In a particular installation, either harness portion 28 or 30 would be used, and the other portion left unused. Another example is the provision of wiring for alternate siren locations, including siren speaker 32 located on the roof area 34 connected through harness portion 36, or alternatively a siren 38 in the hood area 40 connected by way of harness portion 42. Also, the siren amp 43, shown in the trunk area 22, can alternatively be located (not shown) in the dash area 26. The light bar 44 is also the subject of a variety of different system designs. Alternative wiring through harness 14 including portion 46, and provision of programming capability in the control unit 16, allows accommodation of the different designs.

The above-described universal harness 14 is complemented by the control unit 16 which is also designed to be universal, providing various alternative features to accommodate the many different vehicle system designs in use. For example, the control unit 16 is provided with adjustment for either positive or negative going trigger polarity. The control unit 16 also includes adjustment/programmability of other variables, examples of which will be given in the following text of the specification of the present invention. The examples of adjustability in the following figures of the drawing are given by way of example, and the spirit of the invention also includes other variations that would be apparent to those skilled in the art.

FIG. 1 also shows opto-isolator transmission sense circuitry 48 and opto-isolator ignition sense circuitry 50. As will be explained in the following, it is very helpful to have automatic control of the state of certain emergency vehicle accessories, depending on whether the vehicle is or is not in motion, or whether the ignition is on or off.

Opto-isolator transmission sense circuitry 48 connects to a selected vehicle electrical line (not shown) having an electrical condition dependent on the state of the transmission, i.e., whether or not the transmission is in Neutral or Park. The circuit 48 contains an opto-isolator which isolates out vehicle electrical noise. For example, a connection to a line leading directly or indirectly to the starter motor may be sensed to determine if the transmission is in Park or Neutral, since automatic transmission-related circuitry normally allows operation of the starter motor only when the transmission is in Neutral or Park. However, the starter motor circuit and associated relays typically generate quantities of electrical noise that would render the output of a sense circuit unreliable. The opto-isolator circuit reduces the noise, and provides a reliable sense signal to the control unit 16 by way of the harness 14.

The control unit 16 responds to the sense signal from circuit 48 by automatically connecting or disconnecting accessories selected according to the particular vehicle design. The automatic disconnect relieves the vehicle operator of having to manually turn emergency functions off or on that need to change state depending on whether the vehicle is moving or in park or neutral. An example of use of the sense circuit 48 and control unit 16 is to connect the vehicle horn ring/button 57 to activate the siren when the vehicle is in motion and to switch it back to the normal horn when in Park or Neutral. Various light functions can also optionally be modified depending on the transmission state. For example, it is common to include circuitry that alternately lights the right and left vehicle high beams of lights 47, 49 on and off with the vehicle in emergency motion. The sense circuitry 48 and control unit 16 are capable of activating the oscillating high beam feature when the vehicle is in emergency motion and deactivating it when the vehicle is in Park or Neutral. The control unit 16 also contains a noise filter to filter out noise from supply voltage lines. This relatively noise free power also increases the reliability of the above discussed sense circuitry, as well as circuitry within the control unit 16 operating in response to the sensed signal(s). The incorporation of a noise filter for this purpose is a significant improvement over prior art systems.

The opto-isolator ignition sense circuit 50 can also be used as an alternate embodiment, and serves the same purpose as the circuit 48 as far as isolating vehicle electrical noise is concerned. The circuit 50 is attached to a point of the ignition circuit to sense whether the ignition is on or off. The sense condition is then transferred by the wiring harness 14 to the control unit 16 which responds by activating a timer for a pre-set period which allows power to continue to operate selected equipment, such as the radio. The reliability of the timer circuit is also enhanced by the use of low noise power supplied by way of the noise filter discussed above. Either the noise filter or opto-isolator or the combination of both can be used to improve reliability. At the end of the pre-set timer period, the control unit 16 disconnects the power from the selected equipment. This circuitry eliminates the possibility of dead batteries due to electrical equipment left on. The above noted pre-set periods are programmable through use of switches provided in the control unit 16.

The control unit 16 also provides circuitry responsive to the controller 18 to disable the brake and backup lights, a condition useful in patrol car applications of the system 10. In addition, and as a safety measure, the control unit 16 also includes an automatic reconnection of the brake and backup lights if the vehicle light bar is turned on, a condition used for forward emergency motion. This reconnection is for the safety of occupants of following vehicles.

Another feature of the control unit 16 adding to its universal nature, and as part of the above mentioned programmability, is the incorporation of numerous moveable jumper shunts for selecting various conditions which will be fully explained in reference to the following figures of the drawing. These shunts eliminate the need to modify harness wiring in order to change operation. The prior art wiring methods require disassembly and modification of the original installation in order to modify an operation. The control unit electrical noise filtering, referred to above, in addition to providing clean filtered power to the system 10, also provides clean power to vehicle electrical equipment including scanner, cellular phones, mobile radios and data terminals. These accessories are symbolically represented as miscellaneous accessories 52 in FIG. 1.

The control unit 16 includes other novel features including a load shedding fuse circuit, replacing all other fuses in the vehicle except for a single large amperage (typically 100 amp) fuse 67 in series with the battery 69 output, typically located under the hood on the fender well. The control unit also provides LED indicators for the fuses, allowing an operator to easily check the condition of the various electrical circuits. These LED indicators automatically light when the vehicle ignition is turned on. A manual test button is provided for use when the ignition is turned off.

Control unit 16 also includes programming of flashers operating on the rear tail lights 54 and 56. This feature allows the rear tail light flashers to automatically turn on when certain emergency vehicle modes are selected through the console 18.

In order to maximize the vehicle acceleration potential in emergency situations, the system 10 provides for the automatic disconnection of the air conditioning unit 58 when an emergency mode is selected. The many features of the system 10 briefly explained above will be more fully described in the following text in reference to the many figures of the drawing.

Referring again to FIG. 1 of the drawing, the installation of the system 10 in the vehicle 12 can be more fully explained. Although FIG. 1 shows a sedan, the general procedures are applicable to other vehicle types. In the sedan shown in FIG. 1, the barrier 60 between the rear seat area 62 and the trunk area 22 often has a rear access opening 64. If it does not, an opening would need to be made. The control unit 16 is typically mounted to the underside of the rear deck 66, and the siren amp 43 and radio 20 can also be mounted in the trunk area 22. The harness 14 is shown connected to the control unit 16 at point 68 with branches 28 and 70 to the radio 20 and siren amp. The harness is fed through the opening 64 after removal of the rear seat (not shown), and is laid in galley ways 74 that are normally used by vehicle manufacturers for routing wiring. These are accessible after the removal of molding, kick panels, etc. (not shown). In order to accommodate a number of different vehicle types, the harness 14 will in some cases have excessive length. This extra length is folded and stored, for example under the rear seat or dash. A branch 46 is shown routed through openings in the central column 78 and through an opening 80 in the roof to the light bar 44 including siren speaker 32. The harness 14 exits the galley ways 74 and extends into the dash area 26, branching off to the various equipment 48, 50, 52, 18, 24, and 45 by way of harness portions generally noted as 78 in FIG. 1. In order to access the engine compartment, hole 80 is drilled in the firewall 82, a grommet (not shown) is inserted, and the harness 14 is fed through to the engine area 40 where branch 42 may connect to alternate siren speaker 38, and branches 86, 83, 84, 88, 90 and 92 connecting to the air conditioner 58 or related circuitry, fuse 67, right head light 47, warning light 84, grill light 86 and right head light 49. Again, with the prefabricated universal harness 14, installation generally takes about one and a half hours compared to 11 hours using the prior art methods.

Figure 2:
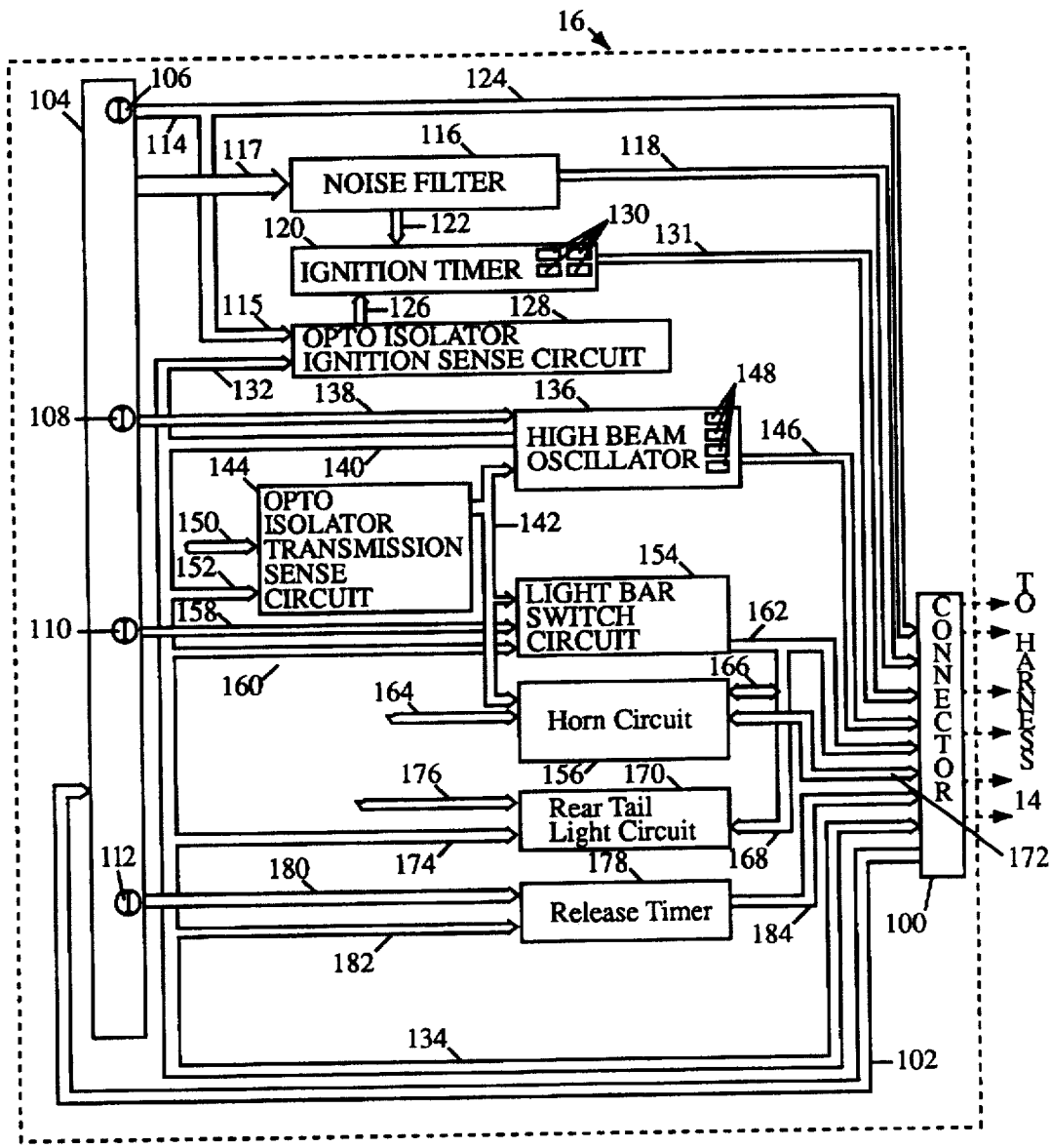
FIG. 2 is a block diagram of the control unit.

Referring now to FIG. 2 of the drawing, there is shown a block diagram of the control unit 16 electronics. The blocks are all noted as interconnected by bus lines for simplicity of explanation, even in those cases where only one line is included in the bus. Interconnection with the harness 14 is represented by connector block 100, which can be any number of connectors or connections. Bus 102 carries main power to a load shedder 104 which contains a fused distribution network supplying power to the various circuits, and the LED circuit status lights mentioned in the above and represented in FIG. 2 by the encircled "T's" 106–112, the circled "T" 106 representative of a multiplicity of LEDs, each associated with a separate fused line, all indicated as passing through bus 114. Although FIG. 2 does not show the LED circuitry, it will be fully discussed in relation to FIG. 14. A signal for turning on the LED indicator circuits is obtained through connection to a point in the ignition circuit, which can be considered as arriving through bus 102, although other sources of this signal are possible. The LED indicator circuitry also contains a manual switch allowing the operator to check the condition of the power lines i.e. to check if any fuses 190 are blown. Further detail of the switch will be given in reference to FIGS. 13 and 14. The load shedder 104 outputs fused power to the noise filter 116 through bus 117, and a filtered output is sent through bus 118. The filter 116 also outputs filtered power to the ignition timer 120 by way of bus 122. Power is fed to various lines running through branch 124 of bus 114 and outputting through connector block 100 to the harness 14 to power accessories such as the radio, siren amplifier, etc.

The ignition timer 120 receives fused and filtered power from the noise filter 116 through bus 122, and receives an ignition sense input on bus 126 from the opto-isolator ignition sense circuit 128, or optionally (not shown) directly from the ignition circuit. The ignition timer 120 has settings, selectable by the vehicle operator to set the time delay period. These settings are represented by switches 130. The filtered output power, supplied by the timer 120, is sent to selected accessories through bus 131. The function of the timer is such that for the pre-set time delay period, after the switch input (from bus 126 or directly from branch 132 of bus 134) from the ignition switch circuit (not shown) is turned off, the ignition timer 120 continues to supply power to the selected accessories through bus 131. The optional opto-isolator 128 receives power from the load shedder 104 via branch 115 of bus 114 and makes connection to the ignition circuit through branch 132 of bus 134. It should be pointed out that the use of noise filtered power to operate other circuit functions is a possible alternative in the present invention, the application of the filtered power not being limited to that shown.

The high beam oscillator 136 receives power from the load shedder through bus 138, and receives an enable and alternatively a disable connection from the control console 18 by way of branch 140 of bus 134. The oscillator 136 also receives a disable signal through bus 142 from the opto-isolator transmission sense circuit 144. The output of the high beam oscillator 136 is fed through bus 146 to the wiring harness 14 to power the high beam head lights 47, 49. The rate of oscillation of the high beam oscillator is adjustable by the operator, the adjustment indicated in FIG. 2 as switches 148. The opto-isolator 144 receives power from the load shedder 104 through branch 150 of bus 114 (connection to 114 not shown). A connection to a circuit indicative of the transmission state is made through branch 152 of bus 134. The output from the opto-isolator 144 is through bus 142 to the high beam oscillator 136, the light switch circuit 154, and the horn circuit 156.

As above explained in reference to FIG. 1, when the vehicle transmission is placed in park or neutral, the vehicle transmission state is detected and a filtered signal is provided by the opto-isolator 144 to the high beam oscillator 136 to turn the oscillator off. Similarly, the signal is sent to the light bar circuit 154 via bus 144 to turn off or modify selected lights in the light bar 44.

The light bar circuit 154 receives fused power from the load shedder 104 through bus 158. A connection to the control console 18 is made through branch 160 of bus 134 for operator turn on or turn off of the light bar.

The light bar circuit 154 output is passed by way of bus 162 to connector 100 to the harness 14, which connects to the light bar 44. In a similar manner, the horn circuit 156 receives power through branch 164 of bus 114 from the load shedder 104. The horn circuit 156 can be used to disable the normal horn in an emergency condition and hook the horn ring up to an alternate device. For example, it can connect the siren to the horn ring/button 57 when the vehicle is in an emergency in-motion state. For this purpose, the horn circuit 156 receives controlling input through connection with selected outputs of the light bar circuit 154 through branch 166 from bus 162, the particular outputs depending on the system design. The input to the horn circuit 156 on bus 142 from the opto-isolator 144 serves to direct the horn circuit to disconnect the horn ring connection to the alternate device and reconnect it to normal horn operation when the vehicle is in the park or neutral state. The connection to the horn ring is illustrated as through bus 172.

The rear tail light circuit 170 receives input from the light bar switch circuit 154 through branch 168 of bus 162 providing signals to activate the rear tail light circuit 170 to turn on the brake lights and backup lights when the selected light bar lights are activated, and to activate a rear flasher to flash the brake and backup lights. Further input through branch 174 of bus 134 connecting to the console 18 allows an operator to turn off the brake and backup lights. The brake and backup light circuit connections are carried to the rear tail light circuit 170 through branch 174 of bus 134. The circuit also responds to the inputs from the light bar switch circuit 154 to over-ride the operator turn-off of the brake lights in an emergency condition. Supply power to the circuit 170 is fused power from load shedder 104 through branch 176 of bus 114.

The release timer 178 receives fused operating power from the load shedder via bus 180 and is connected to the control console 18 through branch 182 connecting to bus 134. When the vehicle operator activates a switch, the timer 178 activates circuitry to unlock a selected device for a pre-set period of time, such as eight seconds, during which time the operator has access to the device. An example of such a requirement would be a gun lock in a patrol car. Upon activation of the switch, the operator would have (for example) eight seconds to remove the gun, at which time the lock is fastened shut again. The same procedure would be required in order put the gun back into place. Connection to the lock is through bus 184.

FIG. 3 gives further details of the load shedder 104, receiving power through line 182 of bus 102 from the vehicle battery 69 through fuse 67 (FIG. 1) and harness 14. The input on line 182 is distributed by bus 188 to the fuses 190. The outputs of the fuses are indicated by the fuse item numbers given in FIG. 2 for reference. The LED fuse/circuit condition indicators 106-112 are not shown in this figure for ease of illustration of the circuit, but will be fully described in relation to FIG. 14. The bus 114 is now seen to include four separate lines 192-198. Lines 192, 194, and 196 could all exit the controller unit 16 via branch 124 (FIG. 2), for example to a radio, the siren amplifier and miscellaneous other accessories. Line 198 would then be left to supply power through bus branches 113, 115, 150, 164, and 176 to the corresponding circuits in the control unit 16. Seven separate fused lines 200-212 are included in bus 158 to the light bar switch circuit 154.

FIG. 4 shows further detail of the light bar switch circuit 154. The seven fused power input lines 200-212 are indicated, and arrive from the load shedder as detailed in FIG. 3. Inputs 214-224 arrive, typically, from the control console 18 or other source of control input to activate the various light bar functions. Examples of light bar functions are indicated in FIG. 4 for sections 226, 228, and 230 of the seven sections 226-238. Section 234 is indicated as empowering a left alley light, section 236 a right alley light, and section 238 a center light. The circuit 154 could also be used to control other lights or devices, depending on the vehicle system design.

The output lines 240-244 and 248-252 provide switched power for the selected light bar functions. Input 254 and output 246 are connected or disconnected together according to the output 244 fed to input 256 of the power switch of section 232. In reference to FIG. 2, the various bus indications, used therein to simplify the description to avoid the need to draw in the individual lines, are also indicated in FIG. 4.

Each section 226-230, 234-238 of FIG. 4 has two jumpers 258 by which an operator can program the input to the power switches 259 for either a high or low enable signal input on lines 214-224, the top line 260 making a direct connection to the power switch 259 and the bottom line 262 having included an inverter 264.

The opto-isolator, either 28 or 144, is shown in FIG. 5. Input 266 (buses 132 or 152 of FIG. 2) is connected to a point in the vehicle electrical circuit having a voltage indicative of the particular required state, i.e., ignition on or off, or in or out of Park/Neutral. The isolator 128, 144 includes an opto-isolator interface 268 and a switching buffer 270. The opto-isolator interface 268 typically contains an LED and a transistor with a light detector at the base, the circuitry being well known to those skilled in the art and not in further need of explanation. The buffer 270 output 272 is carried by buses (lines) 126 or 142 in FIG. 2.

FIG. 6 shows details of the high beam oscillator 136. The outputs driving the vehicle left and right high beams are on lines 274 and 276 (bus 146 in FIG. 2). Fused power is provided on line/bus 138 from the load shedder 104 (FIG. 3). Two high beam power switches 278, 280 are driven by a flasher oscillator 282 in response to a light bar 3 signal on-line 244 (bus 142 FIG. 2) from the light bar switch circuit 154 (FIG. 4). Alternatively, the oscillator 136 can be disabled by providing a control signal from the control console 18 to line 284 (bus 140 FIG. 2) with the jumper 286 in place. This allows the operator to selectively turn off the high beam oscillator when driving in fog or foggy conditions. If the high beam manual disable function jumper 286 is not inserted and the disable function is not desired, the application of power to line 284 will act as an enable line by providing input at 287. In other words, input at 289 will disable the oscillator 282, even though there is input at 287, but with no input at 289 an input at 287 will enable the oscillator. So, having the jumper 286 out allows for turning on the oscillator without requiring turn-on of the light bar. This is used by some as a traffic warning beacon when the vehicle is stationary.

The input line 288 is from the output on bus 142 (FIG. 2) from the opto-isolator transmission sense circuit 144. When the transmission is in Park or Neutral, the circuit 144 outputs a control voltage to input 288 which disables the flasher oscillator 282 and thereby the high beam oscillator circuit 136 and stopping the high beam oscillation/alternate lighting of right and left high beams. This feature can be defeated by removing the jumper 295. The MOSFET high side power supply 297 is for supplying a proper voltage to N-channel MOSFETs in the switches 278, 280. Other types of switching devices could be used, in which case the supply 297 would not be needed.

The high beam detector 291 is also part of the high beam oscillator circuitry 136. It detects the presence of power on both the right and left highbeam lines (274, 276) at the same time. This condition exists when the driver turns on the high beams using the vehicle's head light high beam switch. Although the line normally connecting both high and low beam circuits together is cut in order to make connection to them separately through lines 274 and 276, one of the two lines remains connected to the manual high/low beam switch. When the operator turns the switch to high beam, the connected line received a constant voltage. When the other line receives the voltage by the circuit 136, both lines 274 and 276 at that moment have voltage on them. This triggers the detector 291 to output a disable signal at 293, and also to connect lines 274 and 276 electrically together. This feature allows the operator to over-ride the oscillating highbeams, setting them to a steady on condition.

Referring now to FIG. 7, details of the horn circuit 156 are shown. The inputs 290 and 292 are from the outputs 244 and 242 respectively of the light bar switch circuit 154 (FIG. 4). When either of these two light bar functions are on, and the jumpers 294, 296 are in place, the input(s) at line 290, 292 enable the horn circuit interrupt circuit 298 to connect the horn circuit input line 300 to the horn circuit transfer out line 302, which makes connection to an alternate device, for example to activate the siren 32/38. With no input on lines 290, 292 the circuit 156 connects the input line 300 to the horn circuit output line 304 which supplies power to the normal horn. The input lines 290, 292, are noted in FIG. 2 as branch 166 of bus 162, and the lines 300–304 are noted as bus 172. Line 306 (bus 142 FIG. 2) is from the opto-isolator transmission sense circuit 144 (FIG. 2), and when the vehicle is in Park or Neutral, an input is provided on line 306 which disables the horn circuit interrupt, and the normal horn is operational. Removing jumper 308 defeats this disabling feature, allowing the alternate device to be connected with the vehicle in Park or Neutral.

Lines 310, 312 are connected to the light bar 2 and light bar 3 inputs (lines 290, 292), and are represented as bus 168 in FIG. 2, providing input to the rear tail light circuit 170.

FIG. 8 of the drawing gives details of the rear tail light circuit 170. The circuit has two major functions. One function is to flash the brake and backup lights when the vehicle is in an emergency state, and the other is to provide for fully turning off the brake and backup lights. An input on any one or more of the lines 320–324 (bus 168) with the activated line(s) corresponding jumper(s) 314–318 in place, will enable the rear flasher oscillator 326 to output signals at 328, 330 to turn on the brake light circuit interrupt circuit 332, and backup light circuit interrupt circuit 334, so as to alternately connect and disconnect line 336 to line 338 and line 340 to line 342, causing the brake lights and backup lights to flash on and off. Lines 336, 338 are connected in series with the brake light circuit, and lines 340, 342 are in series with the backup light circuit, all included in branch 174 (FIG. 2). Line input 344 is an operator selected input from console 18 (through branch 174, FIG. 2) for applying a signal to the brake and backup light circuits resulting in the brake and backup lights being turned off. Lines 346 and 348 receive the light bar 3 and light bar 2 signals from bus 168 of FIG. 2, and allow the brake light circuit interrupt 332 and backup light circuit interrupt 334 to be turned off(thus reconnecting the brake and backup lights), i.e. to allow a restoration of normal brake and back-up light functions, even though the vehicle is in an emergency mode or the manual turn-off line 344 is activated. This is a safety feature since the rear tail light interrupt can accidently be left on. It is provided so operators of following vehicles will see brake lights during the emergency moving vehicle condition in the situation when the driver has turned off the brake and backup lights via input at line 344.

The noise filter 116 is shown in FIG. 9, which simply indicates that it is basically a low pass filter 350 with a line input 352 (bus 117, FIG. 2), and filtered power out on lines 354 (bus 118) and 356 (bus 122).

FIG. 10 shows the ignition timer 120. Line 358 receives a signal from the switched side of the vehicle ignition switch circuit (not shown). Line 358 is noted in FIG. 2 as bus 126 from the optional opto-isolator 128. This connection can also be made directly to the vehicle ignition circuit. Turning the ignition switch on activates the timer circuit 360 to output an enable signal at 362 to turn on the output switch 364 to connect the filtered power bus 366 (bus 122, FIG. 2) to the filtered, timed power out line 368 (bus 131, FIG. 2).

When the vehicle ignition switch (not shown) is turned off, the signal at line 358 is gone. At this point, the timer 360 continues to output an enable signal to 362 for the period of time set by the operator. This is noted in FIG. 10 as "switch programmable timer duration" 370.

The release timer 178 is shown in FIG. 11. An input is applied on line 372 (bus 182, FIG. 2) in response to the vehicle operator's activation of a switch located on the control console 18 or other location. In response, the timer 374 outputs an enable signal to activate the output switch 376 to connect power from line 378 (bus 180) to line 380. The power line 380 is then connected to the harness 14 to unlock an electrically operated lock (not shown) for the period of time set by the timer 374. As an alternative embodiment, this time period is adjustable by an operator as indicated by the timer adjustment block 382.

FIG. 12 shows a Y adaptor 384 used in the installation of the system 10 wherever it is necessary to make such a connection to an existing line, such as 386 for illustration. Adaptor 384 has three conducting fasteners 388, 390, 392 interconnected by conductive lines 394, 396, 398. Detail of the fasteners 388–392 is not given. There are many types of fasteners known to those skilled in the art that could be used to fabricate such a Y adaptor, and the invention includes these alternatives. FIG. 12 also shows an auto-resettable circuit breaker 399 that is optionally connected as indicated by dashed line 401 to contact 392. This addition to the Y connector 384 is added for use in making connection to the ignition circuit. Connection to the harness is made through the output 403. The breaker 399 open circuits the connection from 392 to 403 when the current draw is above a pre-set limit, and re-sets the connection when conditions return to normal. A typical breaker 399 heats up with excess current, the temperature causing the open circuit. When the temperature returns to normal, the circuit closes again, reconnecting 392 with 403.

Referring now to FIG. 13, there is shown a perspective view of the control unit 16 illustrating a novel enclosure 406 and mounting apparatus. The enclosure 406 includes a cover 408 and a box 410. The front face 426 of the box 410 has holes 412 through which the LED fuse indicators 106–112 can be viewed. For ease of illustration, not all of the possible indicators are shown. The present invention also includes variations in the number and kind of circuits having LED indicators. The invention also includes other type of indicators known to those skilled in the art. There is also a hole 414 through which an operator can access and activate a switch 417(see FIG. 14) to apply power to the various circuits, allowing the operator to determine the circuit status by viewing the LED indicators. Each LED is connected as shown in FIG. 14 to the output of the corresponding fuse 190 of the load shedder 104 (refer to FIG. 3). For ease of illustration, only the first two fuses 190 and LED indicators of the load shedder 104 are shown in FIG. 14. Each LED indicator includes a resistor (for example 413) connected to the fused line (example line 180) the resistor being connected in series with an LED 423. The manually operable switch 417 is connected between each LED (423) and ground 425. A switch circuit 419 responds to an input at 421 by making connection between the LED cathodes and ground under normal operating conditions.

Referring again to FIG. 13, the cover 408 has a flat top portion 415 and has front tabs 416, 418; one on each side of the top portion 415, and extending down over the box 410. Each tab 416, 418 has a clearance hole 420, 422 for a bolt 424 for securing the front portion 426 of the box 410 to the cover. There is a plain front edge 428 of the cover 408 and an opposing side rear edge flap 430 bent upward away from the top portion 415. There are two rear tabs 432, 434 extending downward from the portion 415, beginning downward at a point near the bend line 431 of the rear edge flap 430.

The rear edge 437 of each rear tab 432, 434 has a slot 436 formed therein, extending downward at an angle between 0° and 90° to the plane of portion 415. The sides of the box 410 have tapped lugs 438, the axis of the taps being is perpendicular to the plane of the rear tabs 432, 434 and centered in the slots 436. Bolts 424 are inserted through the slots 436 and threaded into the lugs 438 to secure the box to the cover. With the bolts 424 threaded in lugs 438, the box as shown in FIG. 13 can rotate downward from the cover in the direction noted by the arrow 440 until the rear upper edge 442 comes in contact with the rear edge flap 430. At this point, gravity holds the box in the slots, and the flap 430 restrains the box from further rotation. This feature provides for easy access for circuit inspection or for making programming adjustments of the various switches and jumpers indicated in the above text. If it is necessary to remove the box, it can be easily done by sliding the box upward out of the slots, or by removing the bolts 424 that extend through the slots. In order to secure the box in a closed position against the cover, front lugs 444 are mounted on each side of the box in line with the clearance holes 420, 422 in the front tabs 416, 418. The box is rotated upward to the cover, and the bolts 424 are inserted through the holes 420 and threaded into the lugs 444, securing the box in place.

Tapped lugs are also provided at four places on the cover, two lugs 446 near one side and two 448 near its opposite side. Two different types of brackets 450 and 452 are shown in FIG. 13 for mounting the cover to the underside of a rear deck of a sedan. The double step bracket 450 is shown above lugs 446, and in use would be bolted to the lugs 446, and another bracket 450 would be bolted to lugs 448, the brackets also bolted to the vehicle rear deck.

The double offset step bracket 452, shown for illustration above the lugs 438 provides for mounting the unit 16 further rearward from the rear deck, the holes 454 for attachment to the rear deck, and holes 456 for bolting to lugs 448. The double offset step bracket 452 can be rotated for mounting to lugs 446, with holes 454 for bolting to lugs 446, and holes 456 for bolting to the rear deck, the two brackets then being symmetrically positioned.

The single step angle bracket 458 is used in conjunction with two lugs 460, each mounted on both the right and left side of the box 410. The bracket 458 is bolted to lugs 460 on the left side through holes 462, as shown, and another bracket 458 is bolted to the lugs 460 attached to the right side of the box 410. Holes 464 are then used to bolt the unit 16 to the floor of the vehicle trunk.

A typical section of a wiring harness 14 is shown in FIG. 15. As shown, the harness 14 is an organized set of wires and connectors, the wires being bound together, having a main trunk 442 with branches of one or more wires that may or may not be bound together. The binding can be done in any of a number of ways, including a wrap 444 as shown, or shrink tubing or other means known to those skilled in the art. In the above specification, the terms bus and branch are used to describe portions of the harness 14 and other parts of the system 10, and may contain one or more wires, with the wires either bound together or not. End 424 shows a number of different types of connectors 446 that are all included in the connector block 100 of the control unit 16. Line 426 is a bus containing only one line such as bus 21 in FIG. 1. Bus 428 shows branches 430, 432, 434, etc., illustrating branches such as buses 88, 90, 92 of bus 84 in FIG. 1. FIG. 15 is only for general illustration of the wiring harness 14 construction, and does not specifically correspond to the illustrations of the other figures of the drawing.

An important feature of the present invention is the inclusion of standardized coded wiring, including color coding or other identification, corresponding to installation manual instructions. Since FIG. 15 does not lend itself well to illustration of colors or patterns, reference is made to FIG. 16 showing three example wires 436, 438, 440 demonstrating the use of various colors such as red 436, blue 438, etc. and stripes 440 (colored or not) of wiring insulation for wire identification, the insulation selected in whatever variety of colors and patterns (stripes or other identification) is desired or needed.

Although a preferred embodiment of the present invention has been described above, it will be appreciated that certain alterations and modifications thereon will be apparent to those skilled in the art. It is therefore intended that the appended claims be interpreted as covering all such alterations and modifications as fall within the true spirit and scope of the invention.

What is claimed is:

1. A re-useable emergency vehicle wiring harness and control system for controlling emergency vehicle accessories comprising:

a) an intergrated control unit having a plurality of control circuits responsive to a control console for controlling said vehicle accessories;

b) a prefabricated wiring harness providing interconnection between said control unit and said accessories and said control console; and c) opto-isolator transmission sense means connected to an electrical line indicative of the vehicle transmission state, said opto-isolator transmission sense means outputting a corresponding reliable sense signal to said wiring harness for passage to said control unit.

2. A control system as recited in claim 1 wherein said system is for use in wiring and control of a new vehicle installation of emergency vehicle accessories.

3. A control system as recited in claim 1 wherein said system is for use in re-wiring an emergency vehicle previously wired with individual wires.

4. A system as recited in claim 2 wherein said control unit and said wiring harness are configured to be easily removable from one vehicle and re-installed in another vehicle.

5. A system as recited in claim 4 wherein said wiring harness has a main bus line and one or more branch bus lines, said main bus line having at least one system interface end for interface with said control unit and said accessories, and each of said branch lines having a junction end for connection to said main bus line and an interface end for interface with said control unit and said accessories.

6. A control system as recited in claim 5 wherein one or more of said interface ends interface with one or more user operable controls.

7. A control system as recited in claim 5 wherein one or more of said branch bus lines is joined to said main bus line at said junction end through use of a multi-conductor connector.

8. A control system as recited in claim 4 wherein said control unit includes an LED display operative to show electrical status of said control circuits.

9. A control system as recited in claim 4 wherein a plurality of said control circuits are user programmable.

10. A control system as recited in claim 1 wherein said wiring harness is configured as a single design that is useable on a plurality of different vehicles and vehicle systems.

11. A control system as recited in claim 1 wherein said prefabricated wiring harness contains one or more wires, each wire of a plurality of said wires having at least one alternate branch providing wiring for an alternate location of an emergency vehicle accessory.

12. A control system as recited in claim 11 wherein said wires have visual identification thereon.

13. A control system as recited in claim 1 wherein said prefabricated wiring harness includes a cable connector for connection to an adaptor cable to interconnect to a particular control console, whereby said cable connector allows said wiring harness to be used with any one of a plurality of control consoles of different design.

14. A control system as recited in claim 1 wherein said wiring harness can be removed as an integral unit from one vehicle and reinstalled in another vehicle.

15. A control system as recited in claim 1 wherein said wiring harness has one or more color coded Y adapters for making electrical connection to an existing vehicle electrical wire.

16. A control system as recited in claim 1 wherein said control circuits are adjustable to accommodate a plurality of different vehicle system designs.

17. A control system as recited in claim 1 wherein said control unit responds to said sense signal by connecting or disconnecting a selected accessory dependent on said transmission state indicated by said sense signal.

18. A control system as recited in claim 17 further comprising:

means for activating a light bar; and wherein when said selected accessory is said light bar, said connecting of said light bar is done when said transmission status is in a forward moving state, and said disconnecting of said light bar is done when said transmission state is in neutral or park.

19. A control system as recited in claim 1 further comprising:

opto-isolator ignition sense means for sensing whether the vehicle ignition circuit is in an "on" or "off" state, and said opto-isolator ignition sense means outputing a sense signal indicative of whether said ignition is "on" or "off".

20. A control system as recited in claim 19 wherein said control unit responds to said sense signal by connecting or disconnecting an accessory dependent on whether said ignition is "on" or "off".

21. A control system as recited in claim 19 further comprising:

timer means responsive to said sense signal to continue to supply operational power to an accessory for a predetermined period of time after said ignition is turned off.

22. A control system as recited in claim 1 wherein said control circuits are programmable.

23. A control system as recited in claim 1 further comprising:

noise filter means for supplying low noise electrical power to said control circuits.

24. A control system as recited in claim 1 further comprising:

timer means responsive to said sense signal to continue to supply operational power to an accessory for a predetermined period of time after an ignition is turned off.

25. A control system as recited in claim 1 wherein said control unit includes a tilt-down case having a cover and a box, said cover having a top portion with two downwardly extending oppositely disposed rear tabs, each said rear tab having a slot formed therein extending downward, and said box having means extending for retaining said box in said slots, and said box being removeable from said slots by lifting said means extending out of said slots.

26. A control system as recited in claim 1 further comprising:

fuse means including a single main fuse for all accessories located under a hood of said vehicle.

27. A control system as recited in claim 1 wherein said control unit includes load shedding fuse means including a plurality of fuses protecting said accessories.

28. A control system as recited in claim 27 wherein said plurality of fuses are accessible for replacement.

29. A control system as recited in claim 28 wherein said load shedding fuse means includes fuse status indicating means for displaying the status of a particular fuse or circuit.

30. A control system as recited in claim 1 further comprising:

rear light flasher means having programmability for flashing rear lights at one of a plurality of rates when said vehicle transmission is in a forward moving state, and an emergency accessory is selected.

31. A re-useable emergency vehicle wiring harness and control system for controlling emergency vehicle accessories comprising:

a) an integrated control unit having a plurality of control circuits responsive to a control console for controlling said vehicle accessories;

b) a prefabricated wiring harness providing interconnection between said control unit and said accessories and said control console; and c) means for disabling vehicle brake and back up lights.

32. A control system as recited in claim 31 further comprising:

means for automatic reconnection of said brake and back up lights if said vehicle transmission is in a forward moving state, and an emergency accessory is activated.

33. A control system as recited in claim 31 wherein said system is for use in wiring and control of a new vehicle installation of emergency vehicle accessories.

34. A system as recited in claim 33 wherein said control unit and said wiring harness are configured to be easily removable from one vehicle and re-installed in another vehicle.

35. A system as recited in claim 34 wherein said wiring harness has a main bus line and one or more branch bus lines.

36. A control system as recited in claim 35 wherein one or more of interface ends interface with one or more user operable controls.

37. A control system as recited in claim 35 wherein one or more of said branch bus lines is joined to said main bus line at a junction end through use of a multi-conductor connector.

38. A control system as recited in claim 34 wherein said control unit includes an LED display operative to show electrical status of said control circuits.

39. A control system as recited in claim 34 wherein a plurality of said control circuits are user programmable.

40. A control system as recited in claim 31 wherein said system is for use in re-wiring an emergency vehicle previously wired with individual wires.

41. A control system as recited in claim 31 wherein said wiring harness is configured as a single design that is useable on a plurality of different vehicles and vehicle systems.

42. A control system as recited in claim 31 wherein said prefabricated wiring harness contains one or more wires, each wire of a plurality of said wires having at least one alternate branch providing wiring for an alternate location of an emergency vehicle accessory.

43. A control system as recited in claim 42 wherein said wires have visual identification thereon.

44. A control system as recited in claim 31 wherein said prefabricated wiring harness includes a cable connector for connection to an adaptor cable to interconnect to a particular control console,
whereby said cable connector allows said wiring harness to be used with any one of a plurality of control consoles of different design.

45. A control system as recited in claim 31 wherein said wiring harness can be removed as an integral unit from one vehicle and reinstalled in another vehicle.

46. A control system as recited in claim 31 wherein said wiring harness has one or more color coded Y adapters for making electrical connection to an existing vehicle electrical wire.

47. A control system as recited in claim 31 wherein said control circuits are adjustable to accommodate a plurality of different vehicle system designs.

48. A control system as recited in claim 31 further comprising:
opto-isolator ignition sense means for sensing whether a vehicle ignition is in an "on" or "off" state, and said opto-isolator ignition sense means outputing a sense signal indicative of whether said ignition is "on" or "off".

49. A control system as recited in claim 48 wherein said control unit responds to said sense signal by connecting or disconnecting an accessory dependent on whether said ignition is "on" or "off".

50. A control system as recited in claim 48 further comprising:
timer means responsive to said sense signal to continue to supply operational power to an accessory for a predetermined period of time after an ignition is turned off.

51. A control system as recited in claim 31 wherein said control circuits are programmable.

52. A control system as recited in claim 31 further comprising:
noise filter means for supplying low noise electrical power to said control circuits.

53. A control system as recited in claim 31 further comprising:
timer means responsive to said sense signal to continue to supply operational power to an accessory for a predetermined period of time after an ignition is turned off.

54. A control system as recited in claim 31 wherein said control unit includes a tilt-down case having a cover and a box, said cover having a top portion with two downwardly extending oppositely disposed rear tabs, each said rear tab having a slot formed therein extending downward, and said box having means extending for retaining said box in said slots, and said box being removable from said slots by lifting said means extending out of said slots.

55. A control system as recited in claim 31 further comprising:
fuse means including a single main fuse for all accessories located under a hood of said vehicle.

56. A control system as recited in claim 31 wherein said control unit includes
load shedding fuse means including a plurality of fuses protecting said accessories.

57. A control system as recited in claim 56 wherein said plurality of fuses are accessible for replacement.

58. A control system as recited in claim 57 wherein said load shedding fuse means includes fuse status indicating means for displaying the status of a particular fuse or circuit.

59. A control system as recited in claim 31 further comprising:
rear light flasher means having programmability for flashing rear lights at one of a plurality of rates when said vehicle transmission is in a forward moving state, and an emergency accessory is selected.

60. A re-useable emergency vehicle wiring harness and control system for controlling emergency vehicle accessories comprising:
a) an integrated control unit having a plurality of control circuits responsive to a control console for controlling said vehicle accessories, said control unit including means for disconnecting vehicle air conditioning when said vehicle transmission is in a forward moving state and an emergency vehicle accessory is activated; and
b) a prefabricated wiring harness providing interconnection between said control unit and said accessories and said control console.

61. A control system as recited in claim 60 wherein said system is for use in wiring and control of a new vehicle installation of emergency vehicle accessories.

62. A system as recited in claim 61 wherein said control unit and said wiring harness are configured to be easily removable from one vehicle and re-installed in another vehicle.

63. A system as recited in claim 62 wherein said wiring harness has a main bus line and one or more branch bus lines.

64. A control system as recited in claim 63 wherein one or more of interface ends interface with one or more user operable controls.

65. A control system as recited in claim 63 wherein one or more of said branch bus lines is joined to said main bus line at a junction end through use of a multi-conductor connector.

66. A control system as recited in claim 62 wherein said control unit includes an LED display operative to show electrical status of said control circuits.

67. A control system as recited in claim 62 wherein a plurality of said control circuits are user programmable.

68. A control system as recited in claim 60 wherein said system is for use in re-wiring an emergency vehicle previously wired with individual wires.

69. A control system as recited in claim 60 wherein said wiring harness is configured as a single design that is useable on a plurality of different vehicles and vehicle systems.

70. A control system as recited in claim 60 wherein said prefabricated wiring harness contains one or more wires, each wire of a plurality of said wires having at least one alternate branch providing wiring for an alternate location of an emergency vehicle accessory.

71. A control system as recited in claim 70 wherein said wires have visual identification thereon.

72. A control system as recited in claim 60 wherein said prefabricated wiring harness includes a cable connector for connection to an adaptor cable to interconnect to a particular control console, whereby said cable connector allows said wiring harness to be used with any one of a plurality of control consoles of different design.

73. A control system as recited in claim 60 wherein said wiring harness can be removed as an integral unit from one vehicle and reinstalled in another vehicle.

74. A control system as recited in claim 60 wherein said wiring harness has one or more color coded Y adapters for making electrical connection to an existing vehicle electrical wire.

75. A control system as recited in claim 60 wherein said control circuits are adjustable to accommodate a plurality of different vehicle system designs.

76. A control system as recited in claim 60 further comprising:

opto-isolator ignition sense means for sensing whether a vehicle ignition is in an "on" or "off" state, and said opto-isolator ignition sense means outputing a sense signal indicative of whether said ignition is "on" or "off".

77. A control system as recited in claim 76 wherein said control unit responds to said sense signal by connecting or disconnecting an accessory dependent on whether said ignition is "on" or "off".

78. A control system as recited in claim 76 further comprising:

timer means responsive to said sense signal to continue to supply operational power to an accessory for a predetermined period of time after said ignition is turned off.

79. A control system as recited in claim 60 wherein said control circuits are programmable.

80. A control system as recited in claim 60 further comprising:

noise filter means for supplying low noise electrical power to said control circuits.

81. A control system as recited in claim 60 further comprising:

timer means responsive to said sense signal to continue to supply operational power to an accessory for a predetermined period of time after said ignition is turned off.

82. A control system as recited in claim 60 wherein said control unit includes a tilt-down case having a cover and a box, said cover having a top portion with two downwardly extending oppositely disposed rear tabs, each said rear tab having a slot formed therein extending downward, and said box having means extending for retaining said box in said slots, and said box being removable from said slots by lifting said means extending out of said slots.

83. A control system as recited in claim 60 further comprising:

fuse means including a single main fuse for all accessories located under a hood of said vehicle.

84. A control system as recited in claim 60 wherein said control unit includes load shedding fuse means including a plurality of fuses protecting said accessories.

85. A control system as recited in claim 84 wherein said plurality of fuses are accessible for replacement.

86. A control system as recited in claim 85 wherein said load shedding fuse means includes fuse status indicating means for displaying the status of a particular fuse or circuit.

87. A control system as recited in claim 60 further comprising:

rear light flasher means having programmability for flashing rear lights at one of a plurality of rates when said vehicle transmission is in a forward moving state, and an emergency accessory is selected.

* * * * *